United States Patent
Brown

(10) Patent No.: US 8,152,414 B2
(45) Date of Patent: Apr. 10, 2012

(54) DEVICE AND METHOD FOR SUPPRESSING VORTEX-INDUCED VIBRATIONS

(76) Inventor: Andrew James Brown, Mayreville (FR)

( * ) Notice: Subject to any disclaimer, the term of this patent is extended or adjusted under 35 U.S.C. 154(b) by 260 days.

(21) Appl. No.: 12/596,824

(22) PCT Filed: Apr. 25, 2008

(86) PCT No.: PCT/GB2008/050304
§ 371 (c)(1),
(2), (4) Date: Jan. 28, 2010

(87) PCT Pub. No.: WO2008/132513
PCT Pub. Date: Jun. 11, 2008

(65) Prior Publication Data
US 2010/0129159 A1  May 27, 2010

(30) Foreign Application Priority Data
Apr. 25, 2007 (GB) .................................. 0708003.9

(51) Int. Cl.
*F15D 1/10* (2006.01)

(52) U.S. Cl. ........................................ 405/211; 114/243

(58) Field of Classification Search ................. 405/211, 405/211.1, 216, 195.1; 114/243
See application file for complete search history.

(56) References Cited

U.S. PATENT DOCUMENTS

| | | | |
|---|---|---|---|
| 5,421,413 A * | 6/1995 | Allen et al. ................... | 405/211 |
| 5,549,417 A * | 8/1996 | Ju et al. ......................... | 405/211 |
| 5,875,728 A * | 3/1999 | Ayers et al. ................... | 114/264 |
| 6,517,289 B1 * | 2/2003 | Coakley et al. ............... | 405/211 |
| 6,685,394 B1 * | 2/2004 | Allen et al. ................... | 405/211 |
| 6,948,884 B2 * | 9/2005 | Xu et al. ....................... | 405/211 |
| 2003/0221603 A1 * | 12/2003 | Horton ......................... | 114/264 |
| 2006/0021560 A1 * | 2/2006 | McMillan et al. ......... | 114/221 R |
| 2008/0131210 A1 * | 6/2008 | Wajnikonis ................... | 405/211 |
| 2009/0185868 A1 * | 7/2009 | Masters et al. ............... | 405/211 |
| 2010/0307762 A1 * | 12/2010 | Howard et al. .............. | 166/350 |

OTHER PUBLICATIONS

ISR PCT/GB08/050304, Nov. 6, 2008, Brown, Andrew James.

* cited by examiner

*Primary Examiner* — Frederick L Lagman
(74) *Attorney, Agent, or Firm* — Hughes Socol Piers Resnick & Dym, Ltd.; Todd S. Parkhurst

(57) ABSTRACT

A device and method for the reduction of vortex-induced vibration of a deepwater riser. A device for attachment to a structure, which is subject to movement relative to a fluid surrounding the structure, for reducing vortex-induced vibration effects on the structure, the device comprising: a flexible netting (4) interconnecting a plurality of relatively inflexible members comprising a plurality of elongate members (3) and a plurality of spacer members (6), wherein each elongate member has a first cuter boundary and each spacer member has a second outer boundary wherein the second boundary extends radially outward of the first outer boundary relative to the netting, over at least: a substantial portion of the boundary.

29 Claims, 2 Drawing Sheets

DEVICE AND METHOD FOR SUPPRESSING VORTEX-INDUCED VIBRATIONS

The present invention relates to a device and a method for the reduction of vibrations in structures, particularly for the reduction of vibrations caused by the relative movement of a structure in a fluid, for example vortex induced vibrations, known as VIV, of a pipe or riser used in the offshore petrochemical industry.

Offshore drilling exploration in deepwater and ultra-deep water has become commonplace. One of the most significant problems to overcome in offshore deepwater drilling is the effect of vortex induced vibrations, VIV, particularly on pipes such as deep-sea risers, or any cylindrical structure that is exposed to external fluid flow.

Vortex induced vibration can lead to large amplitudes of motion and severe cyclical stress in the affected structure, which can cause failure through fatigue. Under these conditions there is a large increase in the "steady" state drag coefficient which can create additional operational problems. When a cylinder is excited in this way the increase in the drag experienced by the structure can be up to a factor of three higher than that of a stationary cylinder.

Methods have been developed to reduce the effect of VIV in structures such as risers. Examples include the use of helical strakes around the riser, axial rod shrouds and perforated shrouds. One such example is the flexible plastic shroud described in U.S. Pat. No. 5,421,413. Generally, known devices can become ineffective if they become covered by marine life such as barnacles and tend to be costly and time consuming to install and uninstall.

Accordingly, there is a need for an improved device and method for reducing such vibration effects.

According to the present invention there is provided a device, for attachment to a structure which is subject to movement relative to a fluid surrounding the structure, for reducing vortex-induced vibration effects on the structure, the device comprising: a flexible net interconnecting a plurality of relatively inflexible members comprising a plurality of elongate members and a plurality of spacer members, wherein each elongate member has a first outer boundary and each spacer member has a second outer boundary wherein the second boundary extends radially outward of the first outer boundary relative to the netting, over at least a substantial portion of the boundary.

In one embodiment each elongate member comprises an integral spacing member, but alternatively each elongate member may be mounted on the netting separate to the spacer members.

A single spacer member may be located spaced from both ends of the elongate member, for example at approximately the centre of the length of the elongate member.

Alternatively each elongate member comprises two spacer members spaced from each other along the length of said elongate member.

According to a preferred embodiment each elongate member comprises an elongate cylinder having a first diameter and a first length, and each spacer member comprises a disc having a second diameter, larger than said first diameter, and a second length, shorter than said first length.

The first length may be between two and six times the first diameter, or preferably between three and five times the first diameter, and even more preferably around three times the first diameter.

The second length is preferably between approximately one half and one and a half times the first diameter, preferably approximately equal to the first diameter.

The first diameter is preferably between approximately one eighth and one twelfth the diameter of the underwater structure and preferably about one tenth of the diameter of the structure.

According to one embodiment each elongate member is hollow. The spacer members may also be hollow.

The spacer members are arranged so that in use they abut the surface of the structure, to locate the elongate members a predefined distance from the surface of the structure.

The flexible netting may comprise a plurality of flexible cords which may be made of polypropylene, for joining the plurality of elongate members and spacer members, arranged as a first, longitudinal, set of cords arranged to join respective sets of elongate members and spacer members in a plurality of generally parallel and spaced lines, with the elongate members being separated one from each other, and a second, transverse, set of cords arranged to join the first set of cords to form said flexible net.

The device is preferably formed as a flexible tube arranged to surround the structure, with a circumference larger than the circumference of the structure.

The inflexible members are also preferably made from polypropylene.

According to a second aspect of the invention there is provided a method of reducing vibrations on a structure which is subject to movement relative to a fluid surrounding the structure, the method comprising surrounding the structure with a device according to the first aspect of the invention.

According to another aspect of the invention there is provided a method of reducing vibrations on a structure which is subject to movement relative to a fluid surrounding the structure, the method comprising: surrounding the structure with a flexible tubular net having a two dimensional arrangement of flexible cords interconnecting a plurality of relatively inflexible members, wherein the inflexible members comprise a plurality of elongate members and a plurality of spacing members arranged to space the elongate members apart from the structure.

The flexible net is arranged to surround the structure with clearance around at least part of the surface of the structure.

The device of the invention can be constructed and installed in a way which makes it capable of suppressing vortex induced vibration (VIV) in structures which are exposed to relative fluid flow, and can prevent the generation of excessively high dynamic drag. The device of the invention is particularly advantageous because it can be constructed to have a relatively small footprint for storage, for example on the deck of a ship, and it is relatively convenient to handle, being relatively light and flexible. It is also easy to deploy and retrieve compared to prior known devices, and can be manufactured relatively economically, particularly compared with current known devices.

The device of the invention can also be constructed and installed to operate in an omni-directional manner and has the advantage of adjusting automatically to the direction of flow, for example of the currents and tidal streams in a deep ocean environment.

The device has the advantage that it provides a stand-off from a structure to which it is attached, in the form of the spacer parts and no additional stand-off mechanism is required to be fitted. In one particularly advantageous embodiment, the spacer members automatically orient themselves in any flowing fluid to present their edges to the current thus minimising resistance to the current.

The present invention will now be described, by way of example, with reference to the accompanying drawings, in which.

Corresponding parts are designated by corresponding reference numbers throughout the drawings.

Figure 1:
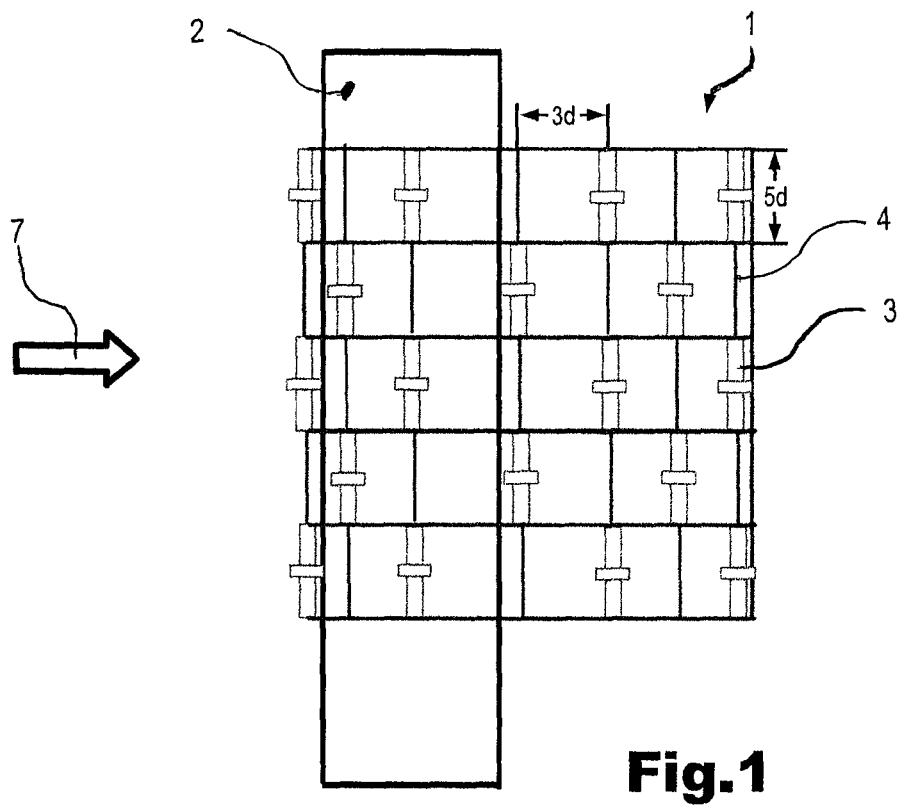
FIG. 1 is a simplified partial side view of the device according to the present invention, fitted to a riser.
Figure 2:
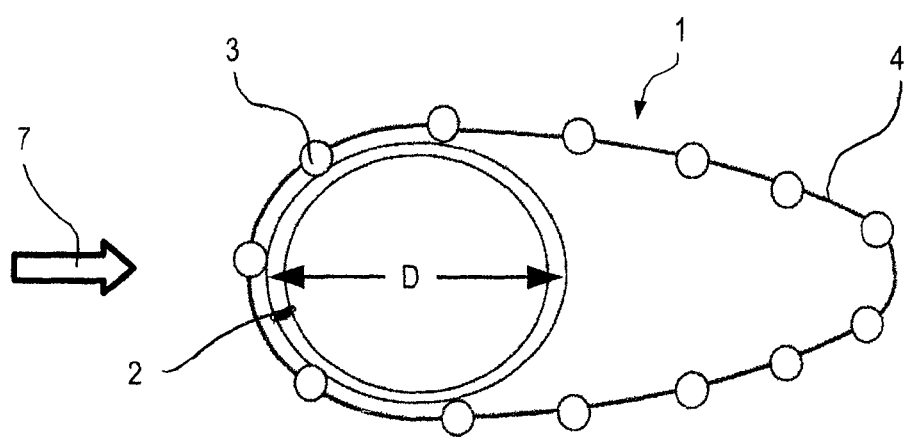
FIG. 2 is a simplified plan view of the device of FIG. 1.

FIGS. 1 and 2 illustrate a flexible net 1 surrounding a pipe 2 in the form of a cylindrical tube which may be an underwater oil or gas riser. The flexible net 1 comprises a series of elongate members or 'rodlets' 3 threaded in a staggered arrangement on cords arranged in a flexible mesh netting 4. The netting 4 is shown in the figures as square mesh, but may be a rectangular mesh with the horizontal spacing of the cords different to the vertical spacing. The shape of the netting mesh and the spacing of the cords will be adjusted to optimise the performance of the net 1 in disrupting vortex shedding for particular conditions of current and pipe size.

The longitudinal axes of the rodlets 3 are substantially aligned with the longitudinal axis of the pipe 2. The configuration of the rodlets 3 allows for efficient stacking and rolling of the net 1. The netting 4 can be made from any material having suitable strength and flexibility properties, for example polypropylene woven into hollow cords. The cords may be woven into a mesh or tied or stitched to form the netting 4 and may be of different thicknesses for the vertical and horizontal parts of the netting.

Alternatively the flexible netting 4 could be made from rigid components connected together in an articulated manner, or hinged, to provide sufficient flexibility. The mesh size and the total circumference of the netting 4 will generally be varied according to the dimensions of the pipe 2, as will be described more fully below.

The rodlets 3 are arranged along the vertical parallel cords of the netting 4 so that each rodlet 3 is separated from its neighbouring rodlets 3 in both the same cord and in adjacent cords. The construction of each of the rodlets 3 is more fully described with reference to FIG. 3 below.

The circumference of the flexible net 1 is arranged to be larger than that of the riser pipe 2, allowing limited movement of the net 1, for example in response to currents and other water flow properties. As illustrated in FIGS. 1 and 2, this movement allows the net 1 to adopt a hydrodynamically efficient shape with a low drag profile in response to the current direction, which is shown on the figures by arrow 7. This advantageously makes the net 1 omni-directional because it will automatically adapt to changes in the flow direction.

Figure 3:
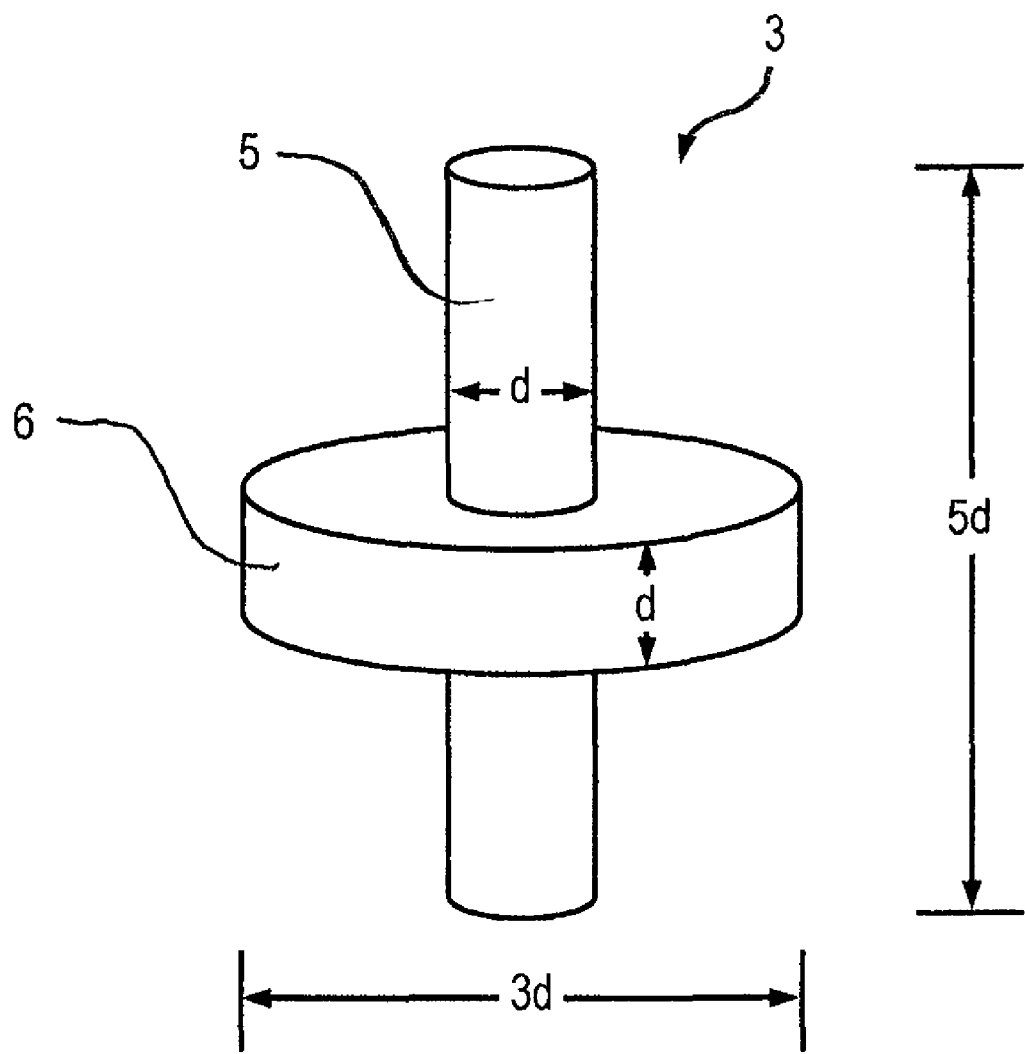
FIG. 3 shows a perspective view of part of the device of FIGS. 1 and 2.

FIG. 3 illustrates one example of a rodlet 3 for use in the flexible net 1 of FIGS. 1 and 2. Each rodlet 3 comprises a first part shaped as a hollow rod 5 and a second part shaped as a disc-shaped spacer 6. The spacer 6 is positioned approximately in the middle of the rod 5 in this embodiment. In another embodiment two generally parallel spacers are provided spaced along the length of the rod either spaced from the ends of the rod or one at each end of the rods.

The ratios of the diameters and lengths of the rod 5 and the spacer 6, and the spacing of the rodlets are selected in relation to the diameter of the pipe 2 to maximise the effectiveness of the net 1 in reducing vibrations and particularly in reducing vortex inducing vibrations and drag. It has been found that it is advantageous for certain dimensions to be inter-related, i.e. to have predefined relationships to each other.

For example, designating the diameter of the rod 5 as d, and the diameter of the riser pipe 2, to which the net is applied, as D, then the preferred dimensions, in approximate broad terms, would be that the length L of the rod 5 is between 3 d and 5 d, the depth T of the spacer 6 is 1 d, the diameter of the spacer 6 is 3 d, and the diameter D of the pipe 2 is about ten times the diameter of the rod, i.e. D is 10 d.

The dimensions of the mesh for the netting 4 are adapted for particular conditions but in the example shown are such that vertical cords are separated by 3 d and horizontal cords by 5 d (the figures are not to scale).

These dimensions are of course approximate and slight variations from these relationships will not alter the effectiveness of the net in a substantial manner. Thus it may be envisaged that the length L of the rod 5 could be between 2 and 6 times the diameter d of the rod 5, that the depth T of the spacer could be between one half and one and a half times the diameter d of the rod 5 and the diameter d of the rod 5 could be between 6 and 14, more preferably between 8 and 12 times smaller than the diameter D of the pipe 2. Although these dimensional relationships generally provide the best performance, different dimensions may be chosen for cost reasons and to make handling easier and will still have a significant effect on VIV reduction. Hence it is envisaged that the diameter d of the rod 5 could be up to 20 times smaller than the diameter D of the structure and still produce beneficial results.

The rod 5 is arranged to be attached to the net 1 by feeding a cord of the netting 4 through a hollow passage along the length of the hollow rod 5.

The rod 5 and the spacer 6 preferably each have circular cross-sections but it is envisaged that multifaceted cross-sections, for example hexagonal or octagonal cross-sections would also work to reduce vortex induced vibrations.

A second stabilising spacer (not shown) can optionally be included along the length of the rod 5 to ensure that the rodlets 3 are positioned substantially parallel to the riser pipe 2 during operation of the net 1.

The rod 5 and the spacer 6 may be manufactured independently and may be made from different materials, but preferably they are manufactured integrally and from the same material. In a preferred embodiment each rodlet 3 is machined or moulded from a solid polypropylene bar. They could alternatively be made by screwing two separate rod lengths to either side of the spacer 6 or by forming the spacer 6 in two halves as a collet and clamping the spacer halves to a single rod or to two separate rod lengths. Many other forms of interlocking parts and fastening them together to form rodlets can be envisaged including using captive screws, snap-fit arrangements, bonding, gluing or welding. Advantageously the rodlets can be made by moulding two mirror image halves so that only one impression mould is required.

The rodlets 3 could be made asymmetrical and attached at a point where the cords cross over each other in the netting 4 so as to secure the attitude of the rodlets to the pipe 2.

The spacers 6 could be formed separately from the rods 5 and threaded or otherwise fastened to the netting 4 at separate locations to the rods 5, preferably evenly distributed amongst the rods 5. The spacers 6, either integral with the rods 5 or separate, have rounded edges or could be discus-shaped. It is known that spherical shapes themselves shed vortices and therefore a spherical rodlet would not reduce VIV and a spherical spacer 6 separate from the rod would be less efficient at reducing VIV. However in the embodiment in which the spacer 6 is integral with the rod it could be generally spherical, of approximately 3 d diameter located at the centre of a rod of at least 5 d length so that the rod 5 protrudes at least 1 d above and 1 d below the spacer 6.

The rodlets 3 may be attached to the netting 4 by being threaded onto the cords as shown. Alternatively the rodlets 3 may comprises a vertical split so that they can be individually attached to the netting 4 at any time, which will allow for replacing rodlets 3 if they become damaged in use.

In laboratory tests on a model pipe of only 2.4 meters length the inventive device was shown to virtually eliminate current-induced motion, and to reduce by about 20% the drag coefficient (typically from around 1.25/1.5 to about 1.12 at a Reynolds Number of 1.4E5). It virtually eliminated the high frequency vibration throughout a range of velocities and the natural frequency of the riser reduced from 1.65 Hz to approximately 1.5 Hz. Damping was also increased so that any vibrations decayed rapidly.

In the tests, the optimum geometry for the device was seen using a rodlet of 5 d length with cord spacing in the netting the same and using a circumferential length for the net 1 of about 5.38 D (1.71 piD). It is considered that the best results will be achieved for circumferential lengths for the device below 2 piD, preferably around 1.5 piD, and more preferably around 4 D.

The device of the invention can be used to reduce VIV in drilling risers, production risers, tension members, pipelines on the seabed, flexible pipelines and jumpers, and for casing and cables. It could be used as a continuous length positioned at problem places along the pipeline or riser, such as at depths where current is known to exist, or as discrete lengths for each joint, loosely collared to the pipe as appropriate.

Pipeline could be laid directly through the device toward and/or on the seabed.

The device can be manufactured to be neutrally or slightly positively buoyant to minimise vertical loading issues which otherwise would affect existing structures.

The invention claimed is:

1. A device for attachment to a structure which is subject to movement relative to a fluid surrounding the structure, the device being adapted for reducing vortex-induced vibration effects on the structure, the device comprising:
 a flexible netting interconnecting a plurality of relatively inflexible members comprising a plurality of elongate members and a plurality of spacer members,
 wherein each elongate member has a first outer boundary and each spacer member has a second outer boundary wherein the second boundary extends radially outward of the first outer boundary relative to the netting, over at least a substantial portion of the boundary.

2. A device according to claim 1, wherein each elongate member comprises an integral spacing member.

3. A device according to claim 1, wherein each elongate member is mounted on the netting separate to the spacer members.

4. A device according to claim 2, wherein the spacer member is located spaced from both ends of the elongate member.

5. A device according to claim 4 wherein the spacer member is approximately at the centre of the length of the elongate member.

6. A device according to claim 1, wherein each elongate member comprises two spacer members spaced from each other along the length of said elongate member.

7. A device according to claim 1, wherein each elongate member comprises an elongate cylinder having a first diameter and a first length, and each spacer member comprises a disc having a second diameter which is larger than said first diameter, and a second length which is shorter than said first length.

8. A device according to claim 7, wherein said first length is between two and six times said first diameter.

9. A device according to claim 8, wherein said first length is between three and five times said first diameter.

10. A device according to claim 7, wherein said second diameter is approximately three times said first diameter.

11. A device according to claim 7, wherein said second length is approximately between one-half and one and one-half times said first diameter.

12. A device according to claim 11, wherein said second length is approximately equal to said first diameter.

13. A device according to claim 7, wherein said first diameter is approximately between one-eighth and one-twelfth the diameter of the structure.

14. A device according to claim 13, wherein said first diameter is approximately one-tenth of the diameter of the structure.

15. A device according to claim 7 wherein said first diameter is approximately between one-twelfth and one-twentieth the diameter of the structure.

16. A device according to claim 1, wherein each elongate member is hollow.

17. A device according to claim 1, wherein said spacer members are arranged to abut the surface of said structure to locate the elongate members at a predefined distance from the surface of the structure.

18. A device according to claim 1, wherein said flexible netting comprises a plurality of flexible cords for joining the plurality of elongate members and spacer members.

19. A device according to claim 18, wherein said flexible cords comprise a first, longitudinal, set of cords arranged to join respective sets of elongate members and spacer members in a plurality of generally parallel and spaced lines, with the elongate members being separated one from each other.

20. A device according to claim 19, wherein said flexible cords comprise a second, transverse, set of cords arranged to join the first set of cords to form said flexible net.

21. A device according to claim 1, wherein said device is formed as a flexible tube arranged to surround the structure.

22. A device according to claim 21, wherein the flexible tube has a circumference approximately four times larger than the diameter of the structure.

23. A device according to claim 1, wherein the flexible netting comprises polypropylene.

24. A device according to claim 1, wherein the inflexible members are made from polypropylene.

25. A method of reducing vibrations on a structure which is subject to relative movement compared to a fluid surrounding the structure, the method comprising surrounding the structure with a device according to claim 1.

26. A method of reducing vibrations on a structure which is subject to relative movement compared to a fluid surrounding the structure, the method comprising:
 surrounding the structure with a flexible tubular net having a two dimensional arrangement of flexible cords interconnecting a plurality of relatively inflexible members, wherein the inflexible members comprise a plurality of elongate members and a plurality of spacing members arranged to locate the elongate members at positions spaced from the structure.

27. A method according to claim 26, wherein the flexible net is arranged to surround the structure with clearance around at least part of the surface of the structure.

28. A method according to claim 26, wherein the structure comprises an underwater pipe.

29. A method according to claim 27 wherein each elongate member has a diameter and the structure has a diameter, and the elongate member diameter is approximately between one-tenth and one-twentieth the structure diameter.

* * * * *